(12) United States Patent
Ono et al.

(10) Patent No.: US 8,368,742 B2
(45) Date of Patent: Feb. 5, 2013

(54) INFORMATION PROCESSING APPARATUS, INFORMATION PROCESSING METHOD AND PROGRAM

(75) Inventors: Kenichi Ono, Tokyo (JP); Takahiro Tomita, Tokyo (JP); Tomoki Okuzono, Kanagawa (JP)

(73) Assignee: Sony Corporation, Tokyo (JP)

( * ) Notice: Subject to any disclaimer, the term of this patent is extended or adjusted under 35 U.S.C. 154(b) by 495 days.

(21) Appl. No.: 12/619,099

(22) Filed: Nov. 16, 2009

(65) Prior Publication Data

US 2010/0165074 A1 Jul. 1, 2010

(30) Foreign Application Priority Data

Dec. 26, 2008 (JP) ................................. 2008-334346

(51) Int. Cl.
*H04N 7/14* (2006.01)
(52) U.S. Cl. .................................. 348/14.16; 348/14.07
(58) Field of Classification Search ............... 348/14.01, 348/14.07, 14.15, 14.16
See application file for complete search history.

(56) References Cited

U.S. PATENT DOCUMENTS

| | | | | |
|---|---|---|---|---|
| 5,436,639 A | * | 7/1995 | Arai et al. ..................... | 345/156 |
| 5,801,919 A | * | 9/1998 | Griencewic .............. | 361/679.26 |
| 6,297,846 B1 | * | 10/2001 | Edanami ...................... | 348/239 |
| 6,587,151 B1 | * | 7/2003 | Cipolla et al. ................ | 348/373 |
| 7,034,848 B2 | * | 4/2006 | Sobol ............................ | 345/620 |
| 7,061,536 B2 | * | 6/2006 | Cha ............................... | 348/376 |
| 2002/0023133 A1 | * | 2/2002 | Kato et al. .................... | 709/205 |
| 2008/0158340 A1 | * | 7/2008 | Shibata et al. ............. | 348/14.16 |
| 2009/0278913 A1 | * | 11/2009 | Rosenfeld et al. ......... | 348/14.16 |

FOREIGN PATENT DOCUMENTS

JP 2004-159061 6/2004

* cited by examiner

*Primary Examiner* — Quoc D Tran
(74) *Attorney, Agent, or Firm* — Oblon, Spivak, McClelland, Maier & Neustadt, L.L.P.

(57) ABSTRACT

An information processing apparatus is provided which includes a display unit that displays predetermined information, an imaging unit that is installed on a right side or left side of a central portion of an upper frame of an outer frame enclosing the display unit to obtain a pickup image of a user, and a control unit that detects a face area of the user from the pickup image obtained by the imaging unit to cut out the face area containing the detected face area.

7 Claims, 11 Drawing Sheets

INFORMATION PROCESSING APPARATUS 100(100A)
132
130(130A)
150
CAMERA MODULE 150
130(130A) IMAGE DISPLAY APPARATUS
132 LCD MODULE
110 MAIN BODY 220
210

INFORMATION PROCESSING APPARATUS 100(100B)
132
130(130B)
150
130(130B) IMAGE DISPLAY APPARATUS
132 LCD MODULE
CAMERA MODULE 150
110 MAIN BODY 220
220
210

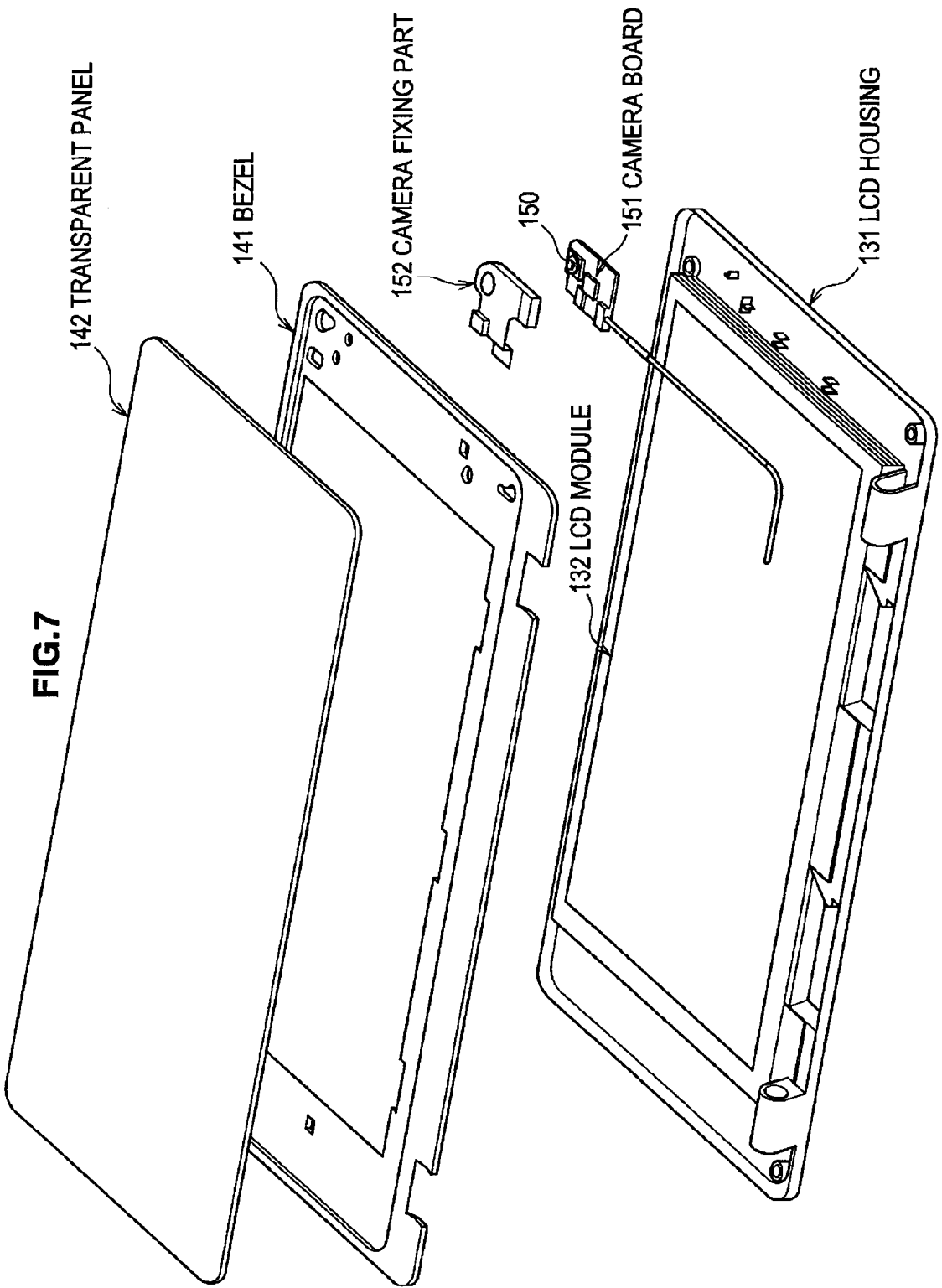

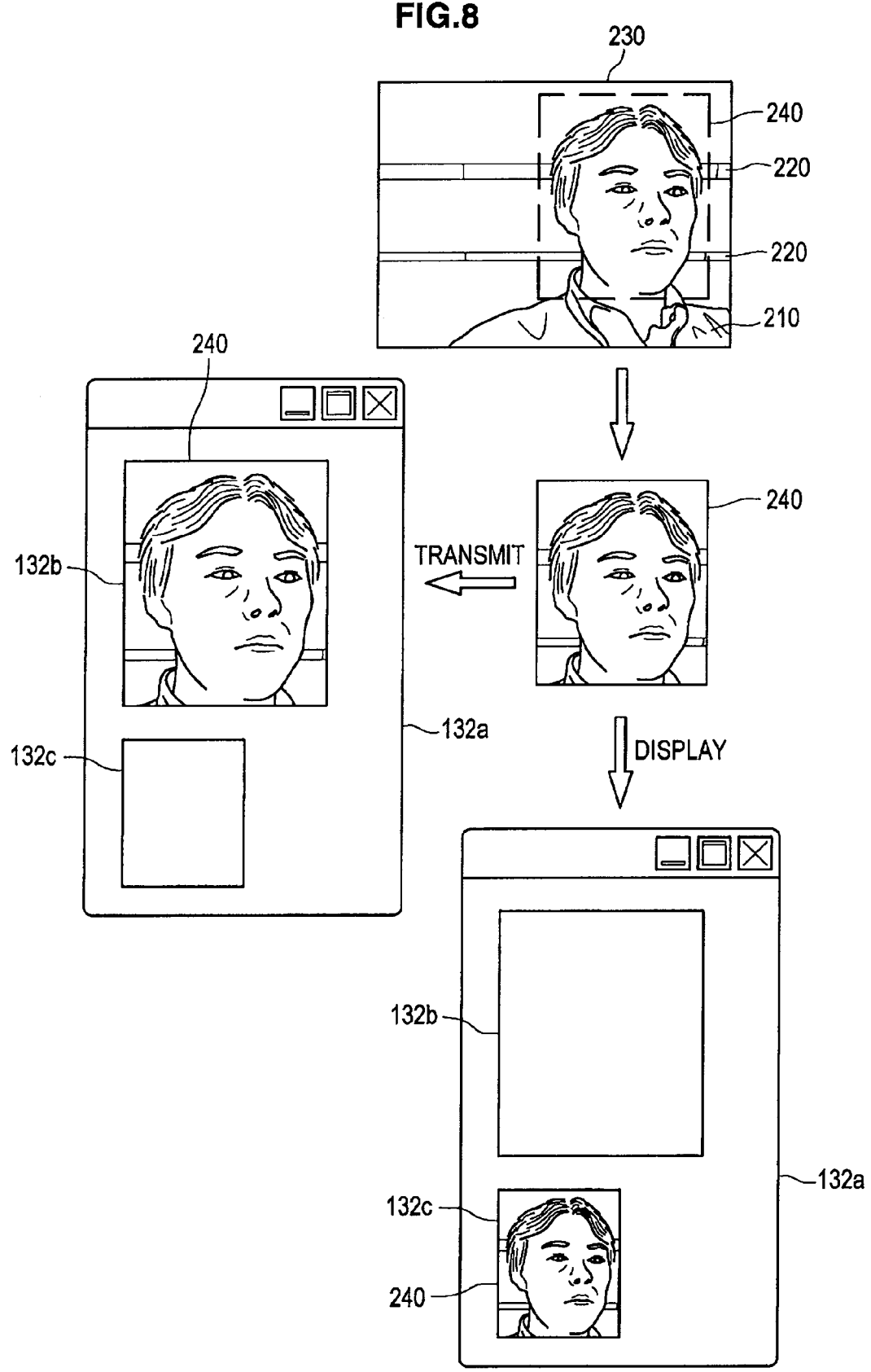

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing, and a program.

2. Description of the Related Art

Nowadays, information processing apparatuses containing a camera are widely used. Such an information processing apparatus images, for example, a user who uses the information processing apparatus and transmits the pickup image obtained by imaging to another apparatus. The transmitted pickup image is displayed, for example, in a display screen or the like of the other apparatus before being used for a TV phone, videoconferencing and the like between the user using the information processing apparatus and another user using the other apparatus.

Japanese Patent Application Laid-Open No. 2004-159061 discloses a technology about an information processing apparatus containing a camera in an outer frame enclosing the display screen. The information processing apparatus disclosed by Japanese Patent Application Laid-Open No. 2004-159061 is provided with a pair of cameras at symmetric positions across the display screen. The information processing apparatus performs signal processing from two pieces of image data by performing stereo imaging of the user positioned before the display screen by cameras to generate an image similar to that when imaged by a camera virtually arranged in the center of the display screen.

Incidentally, when the user uses an information processing apparatus, the information processing apparatus is generally positioned in a horizontal direction or below the horizontal direction when compared with the position of the user's face. If, in such a case, the user is imaged by a camera contained in the information processing apparatus, the user's face will be imaged at an angle looking up from obliquely below, leading to a phenomenon in which the user's face is not imaged charmingly. For example, according to the above technology disclosed by Japanese Patent Application Laid-Open No. 2004-159061, cameras are contained in the upper frame enclosing the display screen of the information processing apparatus and thus, the angle at which the cameras look up at the user will be relatively moderate so that the user's face imaged by the cameras is expected to be relatively charming.

SUMMARY OF THE INVENTION

However, according to the above technology, a camera is contained in a central portion of the upper frame of the outer frame enclosing the display screen of an information processing apparatus and thus, there is an issue that the central portion or a region surrounding the central portion of the upper frame becomes thicker. Since the user frequently looks at the center or a region surrounding the center of the display screen, if the central portion or a region surrounding the central portion of the upper frame becomes thick, there arises an issue that the user may find the display screen relatively small while the outer frame is relatively large. Moreover, if a camera is installed in a position other than the central portion of the upper frame, there is an issue that the user imaged by the camera may not be positioned in the center or a region surrounding the center of an image.

The present invention has been made in view of the above problems and it is desirable to provide a novel and improved technology capable of containing a camera without making a central portion of the upper frame of an outer frame enclosing a display screen thicker and positioning a user imaged by the camera near the center of an image.

According to an embodiment of the present invention, there is provided an information processing apparatus including a display unit that displays predetermined information, an imaging unit that is installed on a right side or left side of a central portion of an upper frame of an outer frame enclosing the display unit to obtain a pickup image of a user, and a control unit that detects a face area of the user from the pickup image obtained by the imaging unit to cut out the face area containing the detected face area.

The imaging unit may be installed near one of edges of the upper frame. The imaging unit may be installed, when viewed from the user, in an upper right crossing area where the upper frame and a right frame of the outer frame cross, or an upper left crossing area where the upper frame and a left frame of the outer frame cross.

The imaging unit may be installed, when viewed from the user, in an upper right crossing area where the upper frame and a right frame of the outer frame cross.

The information processing apparatus may further include a display control unit that displays the predetermined information near a position where the imaging unit is provided in a display area of the display unit. The information processing apparatus may further include a communication unit that performs data communication via a network, and a display control unit that that displays data obtained via the communication unit in the display unit as the predetermined information. The display control unit may display the predetermined information near a position where the imaging unit is provided of a display area of the display unit. The display control unit may display a face image of a communication partner performing data communication via the communication unit and a face image cut out from a pickup image obtained by the imaging unit in the display unit as the predetermined information.

According to the present invention, as described above, it becomes possible to contain a camera without making a central portion of the upper frame of an outer frame enclosing a display screen thicker and to position a user imaged by the camera near the center of an image.

BRIEF DESCRIPTION OF THE DRAWINGS

FIG. 7 is an exploded perspective view showing the configuration of an image display apparatus according to the first embodiment of the present invention;

FIG. 8 is an explanatory view showing how a pickup image by the information processing apparatus according to the first embodiment of the present invention is cut out;

DETAILED DESCRIPTION OF THE EMBODIMENTS

Figure 1A:
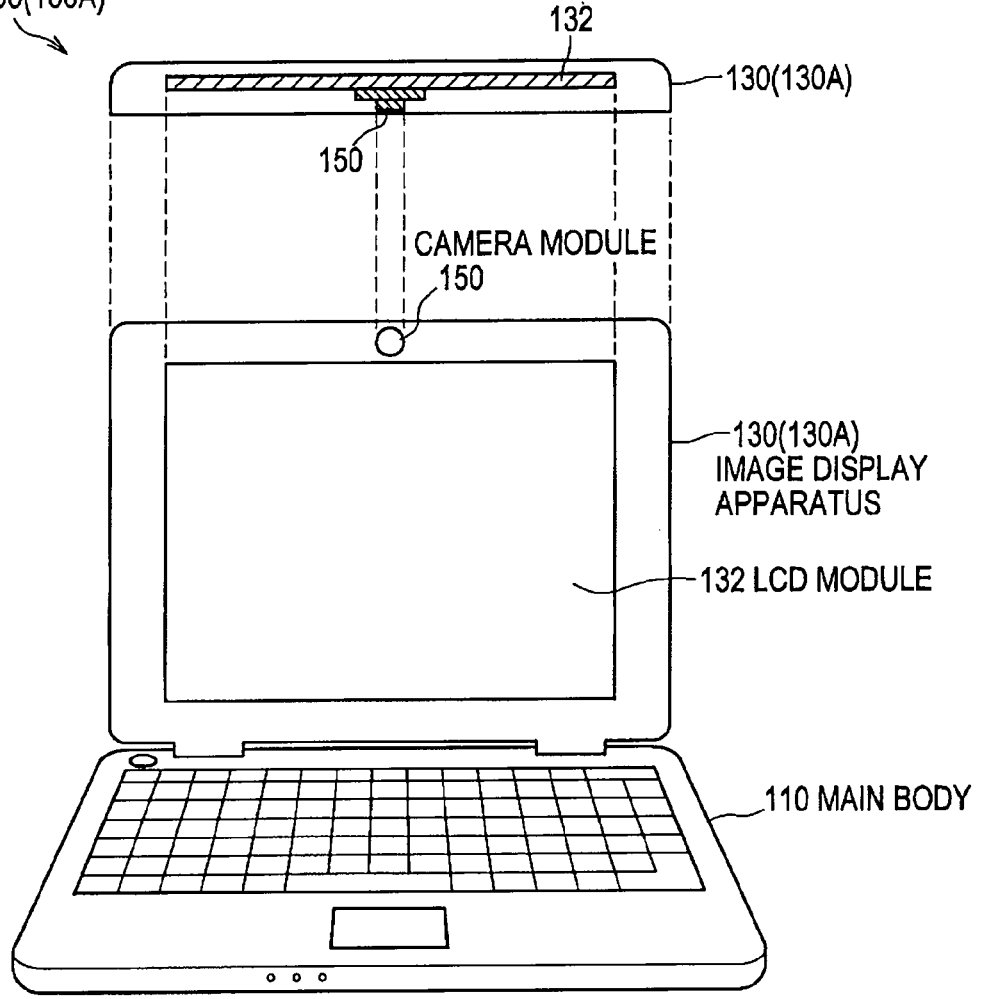
FIG. 1A is an outline configuration diagram showing an outline configuration of an information processing apparatus in which a camera module is installed in a central portion of an upper frame and FIG. 1B is a diagram showing a pickup image obtained by imaging a user using the information processing apparatus in which the camera module is installed in the central portion of the upper frame shown in FIG. 1A by the camera module.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Description will be made in the following order.

1. Description of Camera Module Attached Information Processing Apparatus
2. First Embodiment
  2-1. Outline Description of Information Processing Apparatus (1)
  2-2. Outline Description of Information Processing Apparatus (2)
  2-3. Configuration of Image Display Apparatus
  2-4. Cutout of Pickup Image
  2-5. Functional Configuration of Information Processing Apparatus
  2-6. Hardware Configuration of Information Processing Apparatus
  2-7. Operation of Information Processing Apparatus
3. Modification of Information Processing Apparatus 1. Description of Camera Module Attached Information Processing Apparatus First, a camera module attached information processing apparatus will be described.

[1-1. Information Processing Apparatus in which Camera Module is Installed in Central Portion of Upper Frame]

Figure 1B:

FIG. 1A is an outline configuration diagram showing an outline configuration of an information processing apparatus in which a camera module is installed in a central portion of an upper frame and FIG. 1B is a diagram showing a pickup image obtained by imaging a user using the information processing apparatus in which the camera module is installed in the central portion of the upper frame shown in FIG. 1A by the camera module.

As shown in FIG. 1A, an information processing apparatus 100 includes a main body 110 and an image display apparatus 130. Hereinafter, when information processing apparatuses are distinguished based on the configuration thereof, such information processing apparatuses are denoted as 100A, 100B, . . . and when information processing apparatuses are not distinguished, such information processing apparatuses are denoted as 100. Similarly, when image display apparatuses are distinguished based on the configuration thereof, such image display apparatuses are denoted as 130A, 130B, . . . and when image display apparatuses are not distinguished, such image display apparatuses are denoted as 130. The main body 110 performs processing such as information operations and processes. The image display apparatus 130 displays information obtained by processing of the main body 110.

The image display apparatus 130 mainly includes a liquid crystal display (LCD) module 132 and a camera module 150.

The LCD module 132 is a display apparatus as an example of the display screen and in which liquid crystal devices are integrated. However, the LCD module 132 is only an example of the display apparatus and may be another display apparatus.

The camera module 150 has an image-formation optical system and an image sensor. An image is formed on the image sensor by the image-formation optical system to obtain a pickup image by photoelectric conversion. Pickup images obtained from the image sensor may be moving images obtained chronologically or still images obtained at a certain point. The image sensor is configured of, for example, a charge coupled device (CCD).

When the user uses the information processing apparatus 100A, as described above, the information processing apparatus 100A is generally installed in the horizontal direction or below the horizontal direction when compared with the position of the user's face. If, in such a case, the user is imaged from the camera module 150 contained in the information processing apparatus 100A, the user's face will be imaged at an angle looking up from obliquely below, leading to a phenomenon in which the user's face is not imaged charmingly. Since the camera module 150 is contained in the upper frame of the outer frame enclosing the LCD module 132 in the information processing apparatus 100A, the angle at which the camera module 150 looks up at the user will be relatively moderate so that the user's face imaged by the camera module 150 is expected to be relatively charming.

As shown in FIG. 1B, a user 210 obtained by being imaged from the camera module 150 installed at the position shown in FIG. 1A is relatively charming. Moreover, the angle at which the camera module 150 looks up at a fluorescent lamp 220 is also relatively moderate and thus, reflection of light of the fluorescent lamp 220 from the user 210 will be less so that the user 210 is expected to be imaged more vividly.

In the example shown in FIG. 1A, however, as described above, the camera module 150 is contained in the central portion of the upper frame of the outer frame enclosing the LCD module 132 of the information processing apparatus 100A and thus, the central portion or a region surrounding the central portion of the upper frame becomes thicker. The user frequently looks at the center or a region surrounding the center of the LCD module 132 and thus, if the central portion or a region surrounding the central portion of the upper frame becomes thick, the user may find the LCD module 132 relatively small while the outer frame is relatively large.

[1-2. Information Processing Apparatus in which Camera Module is Installed in Central Portion of Lower Frame]

Figure 2A:
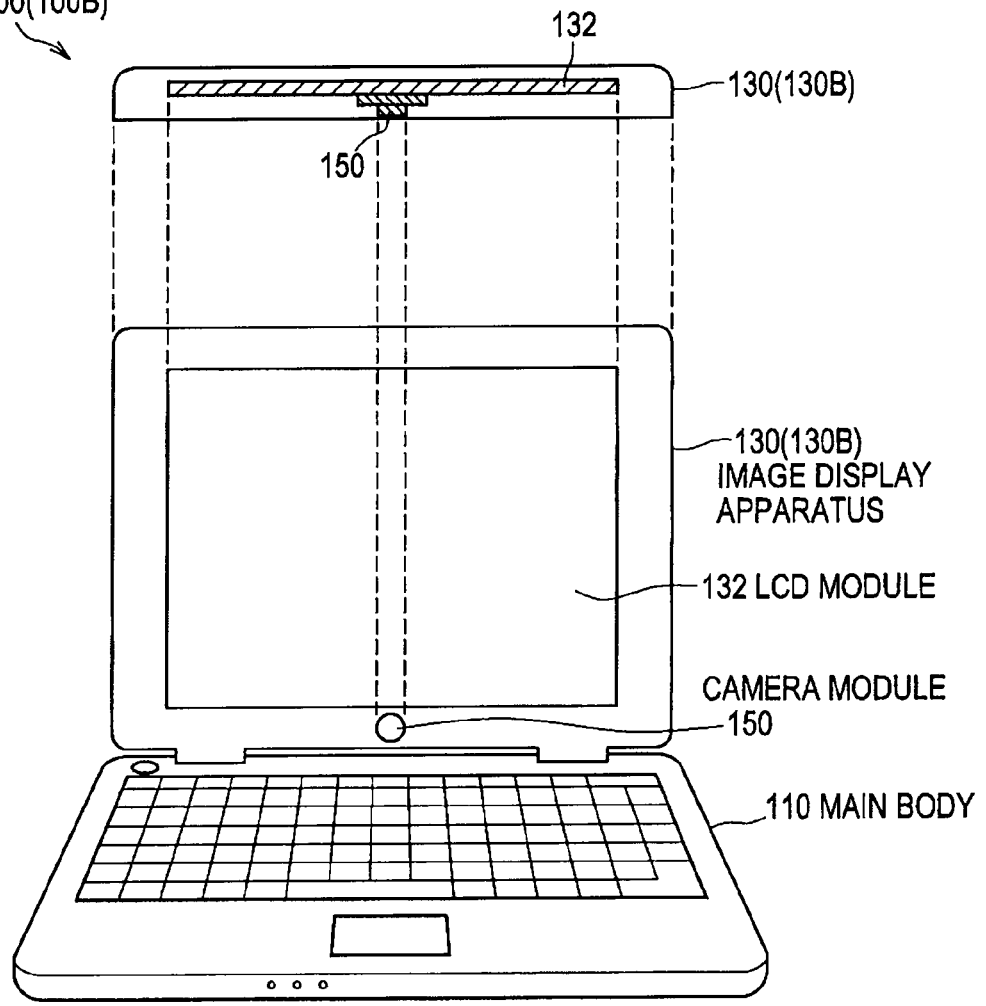
FIG. 2A is an outline configuration diagram showing the outline configuration of an information processing apparatus in which the camera module is installed in the central portion of a lower frame and FIG. 2B is a diagram showing a pickup image obtained by imaging the user using the information processing apparatus in which the camera module is installed in the central portion of the lower frame shown in FIG. 2A by the camera module.
Figure 2B:

FIG. 2A is an outline configuration diagram showing the outline configuration of an information processing apparatus in which the camera module is installed in the central portion of a lower frame and FIG. 2B is a diagram showing a pickup image obtained by imaging the user using the information processing apparatus in which the camera module is installed in the central portion of the lower frame shown in FIG. 2A by the camera module.

Since, as shown in FIG. 2A, the camera module 150 is contained in the lower frame of the outer frame enclosing the LCD module 132 in the information processing apparatus 100B, the angle at which the camera module 150 looks up at the user will be relatively sharp so that the user's face imaged by the camera module 150 is expected to be not so charming.

As shown in FIG. 2B, the user 210 obtained by being imaged from the camera module 150 installed at the position shown in FIG. 2A is not so charming. Moreover, the angle at which the camera module 150 looks up at the fluorescent lamp 220 is also relatively sharp and therefore, reflection of light of the fluorescent lamp 220 from the user 210 will increase so that the use 210 may not be imaged so vividly.

[1-3. Information Processing Apparatus (1) in which Camera Module is Installed in a Portion Other than Central Portion of Upper Frame]

Figure 3A:
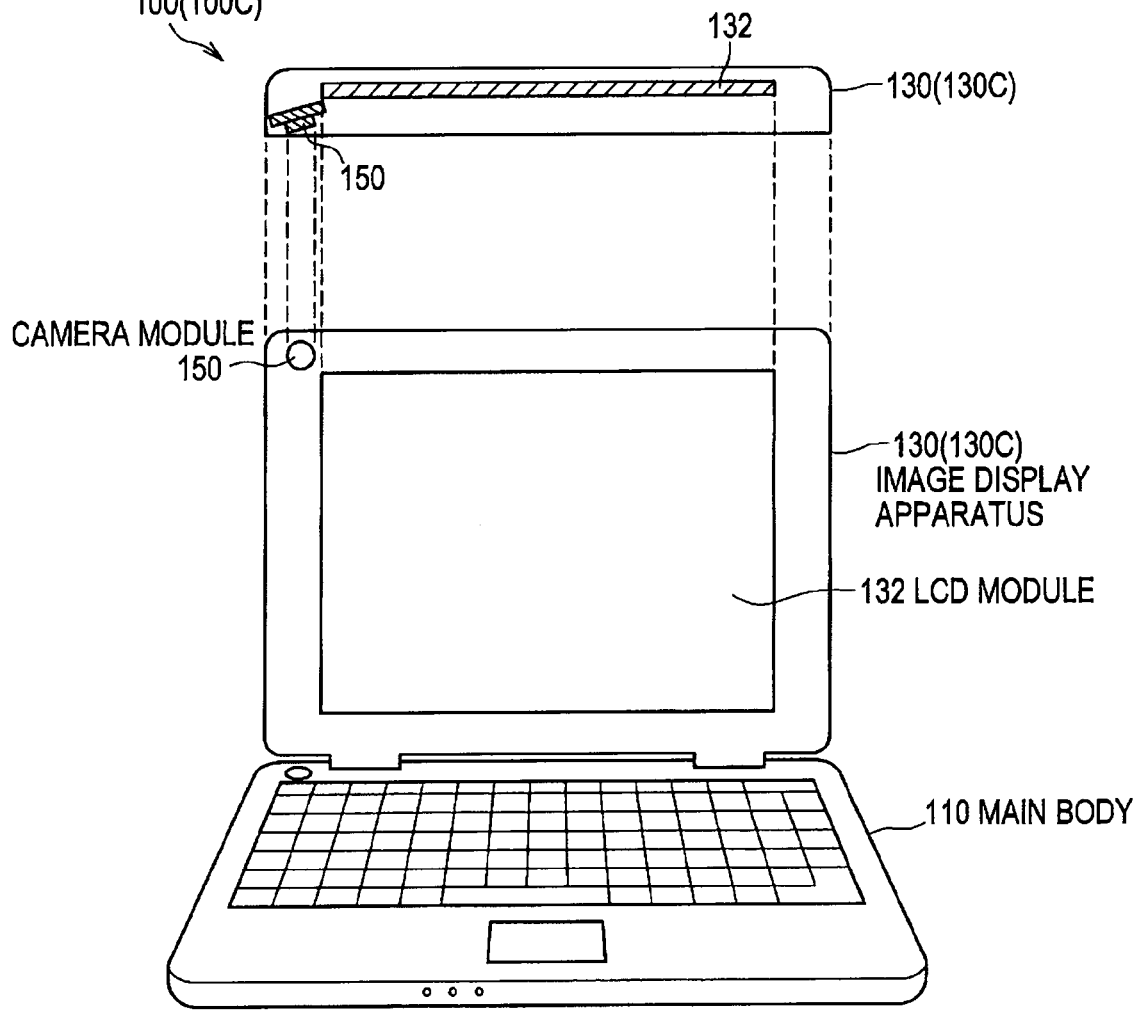
FIG. 3A is an outline configuration diagram showing the outline configuration of an information processing apparatus (1) in which the camera module is installed in a portion other than the central portion of the upper frame and FIG. 3B is a diagram showing a pickup image obtained by imaging the user using the information processing apparatus (1) in which the camera module is installed in a portion other than the central portion of the upper frame shown in FIG. 3A by the camera module.
Figure 3B:

FIG. 3A is an outline configuration diagram showing the outline configuration of the information processing apparatus (1) in which the camera module is installed in a portion other than the central portion of the upper frame and FIG. 3B is a diagram showing a pickup image obtained by imaging the user using the information processing apparatus (1) in which the camera module is installed in a portion other than the central portion of the upper frame shown in FIG. 3A by the camera module.

As shown in FIG. 3A, the camera module 150 is installed in an inclined direction with respect to the user in the information processing apparatus 100C. Accordingly, it is expected that the camera module 150 will be enabled to image the user in the center or a region surrounding the center of a pickup image. Since the camera module 150 is contained in a portion other than the central portion of the upper frame of the outer frame enclosing the LCD module 132 of the information processing apparatus 100C, there is no need to make the central portion or a region surrounding the central portion of the upper frame thicker. Moreover, since the camera module 150 is contained in the upper frame of the outer frame enclosing the LCD module 132 in the information processing apparatus 100C, the angle at which the camera module 150 looks up at the user will be relatively moderate so that the user's face imaged by the camera module 150 is expected to be relatively charming.

As shown in FIG. 3B, while the angle at which the camera module 150 looks up at the fluorescent lamp 220 is relatively moderate, the camera module 150 is inclined and therefore, reflection of light of the fluorescent lamp 220 from the user 210 will increase so that the use 210 may not be imaged so vividly.

In the example shown in FIG. 3A, the camera module 150 of the information processing apparatus 100C is inclined and thus, the thickness of the upper frame increases. With an increase in thickness of the upper frame, the thickness of the information processing apparatus 100C will increase, resulting in inconvenience for the user to carry the information processing apparatus 100C.

[1-4. Information Processing Apparatus (2) in which Camera Module is Installed in a Portion Other than Central Portion of Upper Frame]

Figure 4A:
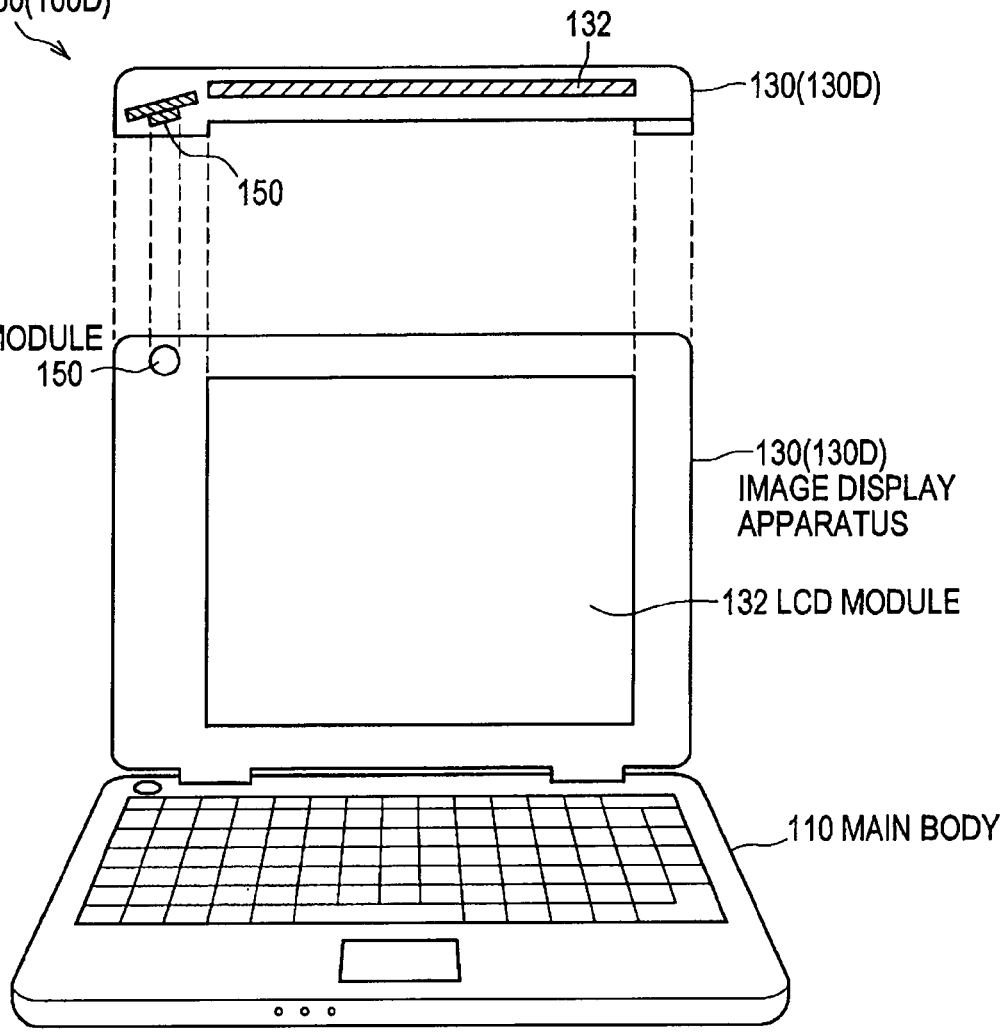
FIG. 4A is an outline configuration diagram showing the outline configuration of an information processing apparatus (2) in which the camera module is installed in a portion other than the central portion of the upper frame and FIG. 4B is a diagram showing a pickup image obtained by imaging the user using the information processing apparatus (2) in which the camera module is installed in a portion other than the central portion of the upper frame shown in FIG. 4A by the camera module.
Figure 4B:

FIG. 4(a) is an outline configuration diagram showing the outline configuration of the information processing apparatus (2) in which the camera module is installed in a portion other than the central portion of the upper frame and FIG. 4(b) is a diagram showing a pickup image obtained by imaging the user using the information processing apparatus (2) in which the camera module is installed in a portion other than the central portion of the upper frame shown in FIG. 4(a) by the camera module.

As shown in FIG. 4(a), the camera module 150 is installed in an inclined direction with respect to the user in the information processing apparatus 100D. This is similar to information processing apparatus 100C shown in FIG. 3A. Accordingly, it is expected that the camera module 150 will be enabled to image the user in the center or a region surrounding the center of a pickup image. In order to prevent an increase in thickness of the whole upper frame of the outer frame enclosing the LCD module 132, the information processing apparatus 100D adopts a configuration in which the thickness is partially increased for the location where the camera module 150 is contained. Moreover, since the camera module 150 is contained in a portion other than the central portion of the upper frame of the outer frame enclosing the LCD module 132 of the information processing apparatus 100D, there is no need to make the central portion or a region surrounding the central portion of the upper frame thicker. Furthermore, since the camera module 150 is contained in the upper frame of the outer frame enclosing the LCD module 132 in the information processing apparatus 100D, the angle at which the camera module 150 looks up at the user will be relatively moderate so that the user's face imaged by the camera module 150 is expected to be relatively charming.

As shown in FIG. 4(b), a pickup image obtained by the camera module 150 of the information processing apparatus 100D is similar to that shown in FIG. 3B. While the angle at which the camera module 150 looks up at the fluorescent lamp 220 is relatively moderate, the camera module 150 is inclined and therefore, reflection of light of the fluorescent lamp 220 from the user 210 will increase so that the use 210 may not be imaged so vividly.

In the example shown in FIG. 4(a), the frame (the left frame in the example shown in FIG. 4(b)) where the camera module 150 is contained becomes thicker, making a visible portion of the LCD module 132 smaller. This also applies when the camera module 150 is contained in the right frame. Moreover, efficiency of manufacture is reduced because it is necessary to manufacture the image display apparatus 130 of the information processing apparatus 100D containing the camera module 150 separately from the image display apparatus 130 of the information processing apparatus 100D that does not contain the camera module 150.

2. First Embodiment

Subsequently, a first embodiment of the present invention will be described.

[2-1. Outline Description of Information Processing Apparatus (1)]

Figure 5A:
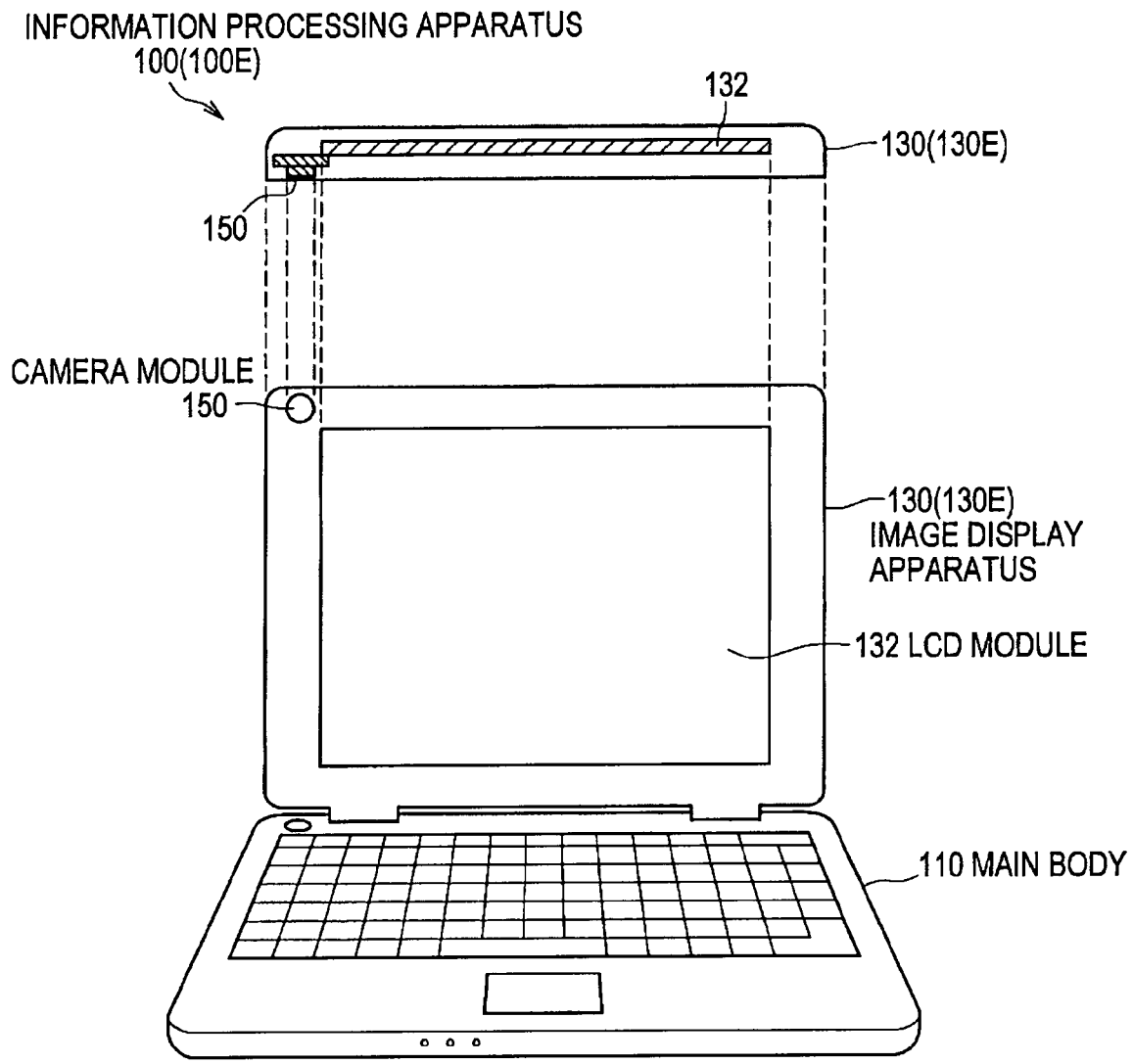
FIG. 5A is an outline configuration diagram showing the outline configuration of the information processing apparatus (1) according to a first embodiment of the present invention and FIG. 5B is a diagram showing a pickup image obtained by imaging the user using the information processing apparatus (1) according to the first embodiment of the present invention shown in FIG. 5A by the camera module.
Figure 5B:

FIG. 5A is an outline configuration diagram showing the outline configuration of the information processing apparatus (1) according to the first embodiment of the present invention and FIG. 5B is a diagram showing a pickup image obtained by imaging the user using the information processing apparatus (1) according to the first embodiment of the present invention shown in FIG. 5A by the camera module.

As shown in FIG. 5A, the camera module 150 is not installed in an inclined direction with respect to the user in the information processing apparatus 100E. Accordingly, the camera module 150 is expected to image the user in a position other than the center or a region surrounding the center of a pickup image. However, since the camera module 150 is not inclined, reflection of light of the fluorescent lamp 220 from the user will decrease so that the user 210 is expected to be imaged more vividly. Moreover, since the camera module 150 is contained in a portion other than the central portion of the upper frame of the outer frame enclosing the LCD module 132 of the information processing apparatus 100E, there is no need to make the central portion or a region surrounding the central portion of the upper frame thicker. Furthermore, since the camera module 150 is contained in the upper frame of the outer frame enclosing the LCD module 132 in the information processing apparatus 100E, the angle at which the camera module 150 looks up at the user will be relatively moderate so that the user's face imaged by the camera module 150 is expected to be relatively charming.

As shown in FIG. 5B, reflection of light of the fluorescent lamp 220 from the user will decrease so that the user 210 is more likely to be imaged vividly. Moreover, the angle at which the camera module 150 looks up at the user 210 will be relatively moderate so that the user's face imaged by the camera module 150 is relatively charming.

However, since the camera module 150 is not installed in an inclined direction with respect to the user, the user 210 is imaged in a position apart from the center or a region surrounding the center of a pickup image. In the present embodiment, the information processing apparatus 100 is assumed to detect a face region of the user 210 imaged in the pickup image and to cut out a face image containing the detected face area.

[2-2. Outline Description of Information Processing Apparatus (2)]

Figure 6A:
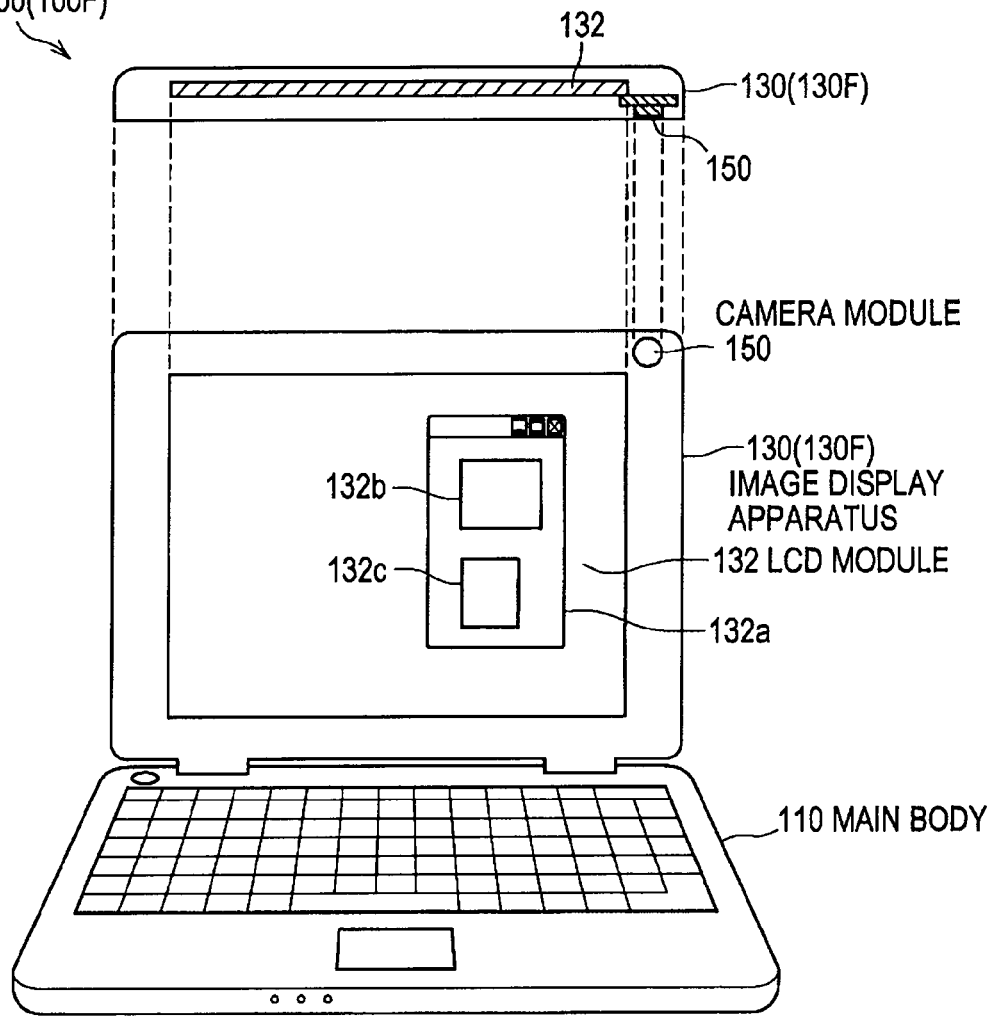
FIG. 6A is an outline configuration diagram showing the outline configuration of the information processing apparatus (2) according to a first embodiment of the present invention and FIG. 6B is a diagram showing a pickup image obtained by imaging the user using the information processing apparatus (2) according to the first embodiment of the present invention shown in FIG. 5A by the camera module.
Figure 6B:
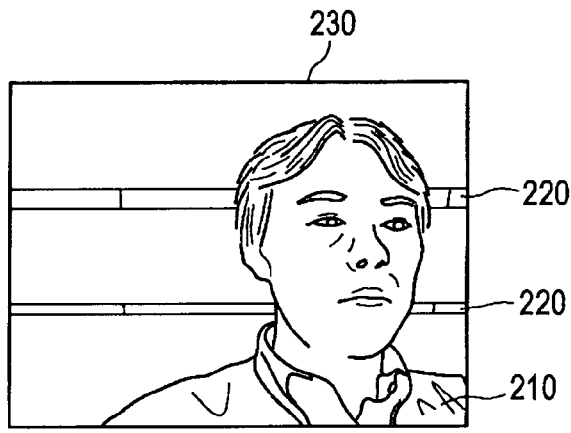

FIG. 6A is an outline configuration diagram showing the outline configuration of the information processing apparatus (2) according to the first embodiment of the present invention and FIG. 6B is a diagram showing a pickup image obtained by imaging the user using the information processing apparatus (2) according to the first embodiment of the present invention shown in FIG. 6A by the camera module.

As shown in FIG. 6A, the information processing apparatus 100F is different from the information processing apparatus 100E in that the camera module 150 is installed on the right side when viewed from the user viewing predetermined information displayed in the LCD module 132. Hereinafter, if not specifically mentioned, the right side or left side of the image display apparatus 130 or the LCD module 132 refers to the right side or left side when viewed from the user viewing predetermined information displayed in the LCD module 132. Therefore, in other respects, the information processing apparatus 100F is the same as the information processing apparatus 100E. Basically, the information processing apparatus 100F has the same properties as those of the information processing apparatus 100E. The pickup image shown in FIG. 6B is almost the same as that shown in FIG. 5B.

However, it is convenient if the camera module 150 is installed on the right side of the image display apparatus 130 like the camera module 150 of the information processing apparatus 100F. A status menu window to select an application is generally expanded from the lower left toward the upper right of the LCD module 132 when viewed from the user viewing predetermined information displayed in the LCD module 132. Therefore, if an application window is arranged on the left side of the LCD module 132, it becomes harder to view the status menu window in the LCD module 132.

Since the user's face is normally positioned on the front side in the center or a region surrounding the center of the LCD module 132, the window of an application used by the user as a main application is arranged in the center or a region surrounding the center of the LCD module 132.

When an application such as a chat is used, a pickup image obtained by the camera module 150 is displayed, for example, as an image 132c of a chat window 132a. A pickup image obtained by a camera module of another apparatus is transmitted by the other apparatus and is displayed, for example, as an image 132b of the chat window 132a. Therefore, the user of the information processing apparatus 100 can have a conversation with a communication partner while confirming a pickup image in which the communication partner is picked up by the image 132b and a pickup image in which the user is picked up by the image 132c. While viewing the window of an application used as a main application, the user generally confirms the chat window 132a separately from the window.

For reasons described above, if the chat window 132a is displayed on the left side of the LCD module 132 in the vicinity of the center thereof, the chat window 132a will frequently be overlapped with the start menu window or the window of an application used as a main application. Therefore, it is convenient to arrange the chat window 132a on the right side of the LCD module 132.

If the chat window 132a is arranged on the right side of the LCD module 132, it is convenient to arrange the camera module 150 at the position in accordance with the chat window 132a. It is assumed, for example, that the camera module 150 is installed on the left side or near the center of the image display apparatus 130 even if the chat window 132a is arranged on the right side of the LCD module 132. In that case, if the user's face is moved toward the camera module 150, the chat window 132a deviates from the line of sight of the user so that it becomes difficult for the user to confirm the face of the communication partner. If the user attempts to view the chat window 132a to confirm the face of the communication partner, the camera module 150 deviates from the line of sight of the user so that the user looks to the communication partner as if to look away.

The chat window 132a and the like are frequently displayed on the right side of the LCD module 132 for reasons described above and it is convenient to correspondingly install the camera module 150 also on the right side of the image display apparatus 130. Or, the chat window 132a and the like may be displayed in the vicinity of the camera module 150. As an acquisition method of installation position information of the camera module 150, for example, the information processing apparatus 100 may have installation position information of the camera module 150 as device information. Or, the display position of the chat window 132a may be decided by estimating the camera position from a pickup face image of the user. More specifically, the display area is divided into three of left, middle, and right areas and a face image of the user is imaged each time the display position is changed. The display area may be divided into six including upper and lower areas and the number of divisions is not specifically limited. Then, an image in which the user faces the front is identified using face recognition technology or the like and then, the chat window 132*a* is displayed in the display area from which the image is obtained. According to this method, there is no need that a face image is present in the center of an pickup image and the display area is solely decided on condition that the user's gaze is cast on the front of the camera. If a face image is not in the center, the face image may be cut out by the trimming function to display the face image in the center of a chat window.

[2-3. Configuration of Image Display Apparatus]

The configuration of an image display apparatus according to the first embodiment of the present invention will be described. FIG. 7 is an exploded perspective view showing the configuration of an image display apparatus according to the first embodiment of the present invention. The configuration of an image display apparatus according to the first embodiment of the present invention will be described below using FIG. 7.

The image display apparatus 130 includes the LCD module 132, an LCD housing on which the LCD module 132 is mounted, the camera module 150, a camera board 151 on which the camera module 150 is mounted, a bezel 141, and a transparent panel 142. The camera module 150 is fixed by a camera fixing part 152.

[2-4. Cutout of Pickup Image]

FIG. 8 is an explanatory view showing how a pickup image by an information processing apparatus according to the first embodiment of the present invention is cut out. The cutout of a pickup image by an information processing apparatus according to the first embodiment of the present invention will be described below using FIG. 8.

The information processing apparatus 100 detects a face area of the user 210 from a pickup image 230 and cuts out a face image 240 containing the detected face area. The information processing apparatus 100 may transmit the cutout face image 240 to another apparatus used by the communication partner of the user 210 or display the face image 240 in the image 132*c* of the chat window 132*a*. The transmitted face image 240 may be displayed in a image 132*b* of a chat window 132*a* of a display screen of another apparatus.

[2-5. Functional Configuration of Information Processing Apparatus]

Figure 9:
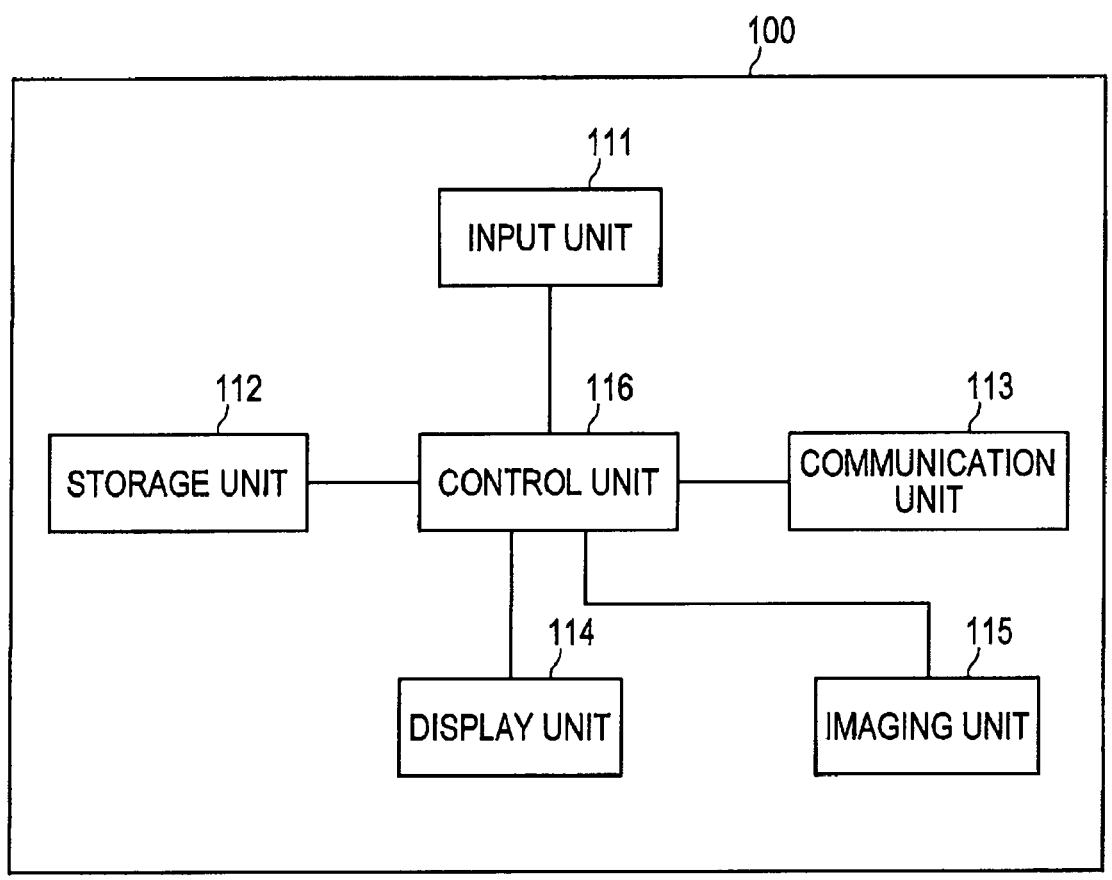
FIG. 9 is a block diagram showing a functional configuration of the information processing apparatus according to the first embodiment of the present invention.

The functional configuration of an information processing apparatus according to the first embodiment of the present invention will be described. FIG. 9 is a block diagram showing the functional configuration of an information processing apparatus according to the first embodiment of the present invention. The functional configuration of an information processing apparatus according to the first embodiment of the present invention will be described below using FIG. 9.

The information processing apparatus 100 includes an input unit 111, a storage unit 112, a communication unit 113, a display unit 114, an imaging unit 115, and a control unit 116.

The input unit 111 is configured of, for example, an input apparatus or the like and has a function to accept input of data from the user 210. In the present embodiment, the input unit 11 has a function to accept input of, for example, operations to activate various applications from the user 210.

The storage unit 112 is configured of, for example, a magnetic storage device such as a hard disk drive (HDD), semiconductor storage device, optical storage device, or magneto-optical storage device. The storage unit 112 is used to store various programs and data and is configured of a storage apparatus or the like.

The communication unit 113 is configured of, for example, a communication apparatus or the like and is capable of performing communication with another apparatus used by the communication partner of the user 210 of the information processing apparatus 100 via the network 300. The communication unit 113 may be capable of performing communication with another apparatus used by the communication partner of the user 210 of the information processing apparatus 100 via a dedicated line.

The display unit 114 is configured of an apparatus, for example, a display apparatus such as a CRT (Cathode Ray Tube) display apparatus, liquid crystal display apparatus, plasma display apparatus, EL (ElectroLuminescence) display apparatus, or lamp capable of visually notifying the user of obtained information. The display unit 114 is used to display predetermined information. The predetermined information is not specifically limited and corresponds, in the above example, to the chat window 132*a*. In the above example, the display unit 114 corresponds, for example, to the LCD module 132.

The imaging unit 115 is configured of, for example, an imaging apparatus 931 and has a function to image the user 210 by being installed in the information processing apparatus 100. The imaging unit 115 is installed on the right side or left side of the central portion in the upper frame of the outer frame enclosing the display unit 114 when viewed from the user 210 viewing predetermined information displayed in the display unit 114 and is used to obtain a pickup image of the user 210. In the above example, the imaging unit 115 corresponds, for example, to the camera module 150 contained in the information processing apparatus 100.

The imaging unit 115 may be installed near an edge of the upper frame of the outer frame when viewed from the user 210. That is, the imaging unit 115 may be installed in an upper right crossing area where the upper frame and the right frame cross, or an upper left crossing area where the upper frame and the left frame of the outer frame cross. Since there are only few cases in which various parts used in the information processing apparatus 100 are contained in the upper right crossing area or upper left crossing area, the possibility of the imaging unit 115 coming into contact with various parts is low even if the imaging unit 115 is installed in these areas.

The imaging unit 115 is preferably installed in the upper right crossing area where the upper frame and the right frame of the outer frame cross, when viewed from the user 210. It is preferable to install the imaging unit 115 in the right frame rather than the left frame because, as described above, the chat window 132*a* and the like are frequently displayed on the right side of the LCD module 132 and it is convenient to correspondingly install the camera module 150 also on the right side of the image display apparatus 130.

The control unit 116 is configured of, for example, a CPU (Central Processing Unit), ROM (Read Only Memory), RAM (Random Access Memory) and the like and is used to detect a face area of the user 210 from the pickup image 230 obtained by the imaging unit 115 to cut out the face image 240 containing the detected face area. Detection of a face area is not specifically limited and, for example, the position of eyes of the user 210 is detected from the pickup image 230 and uses the detected position of eyes as a reference to determine the position or size of a face area. If the pickup images 230 are dynamic images obtained chronologically, a face area can be tracked by face tracking technology. The face image 240 containing a face area is not specifically limited, but it is preferable to decide to have the face area positioned in the center or a region surrounding the center of the face image 240. In the present embodiment, the face image 240 has a rectangular shape containing a face area, but may have other shapes such as circular, ecliptic, or the like.

In the foregoing, the functional configuration of the information processing apparatus 100 according to the first embodiment of the present invention has been described. Next, the hardware configuration of the information processing apparatus 100 according to the first embodiment of the present invention will be described.

[2-6. Hardware Configuration of Information Processing Apparatus]

Figure 10:
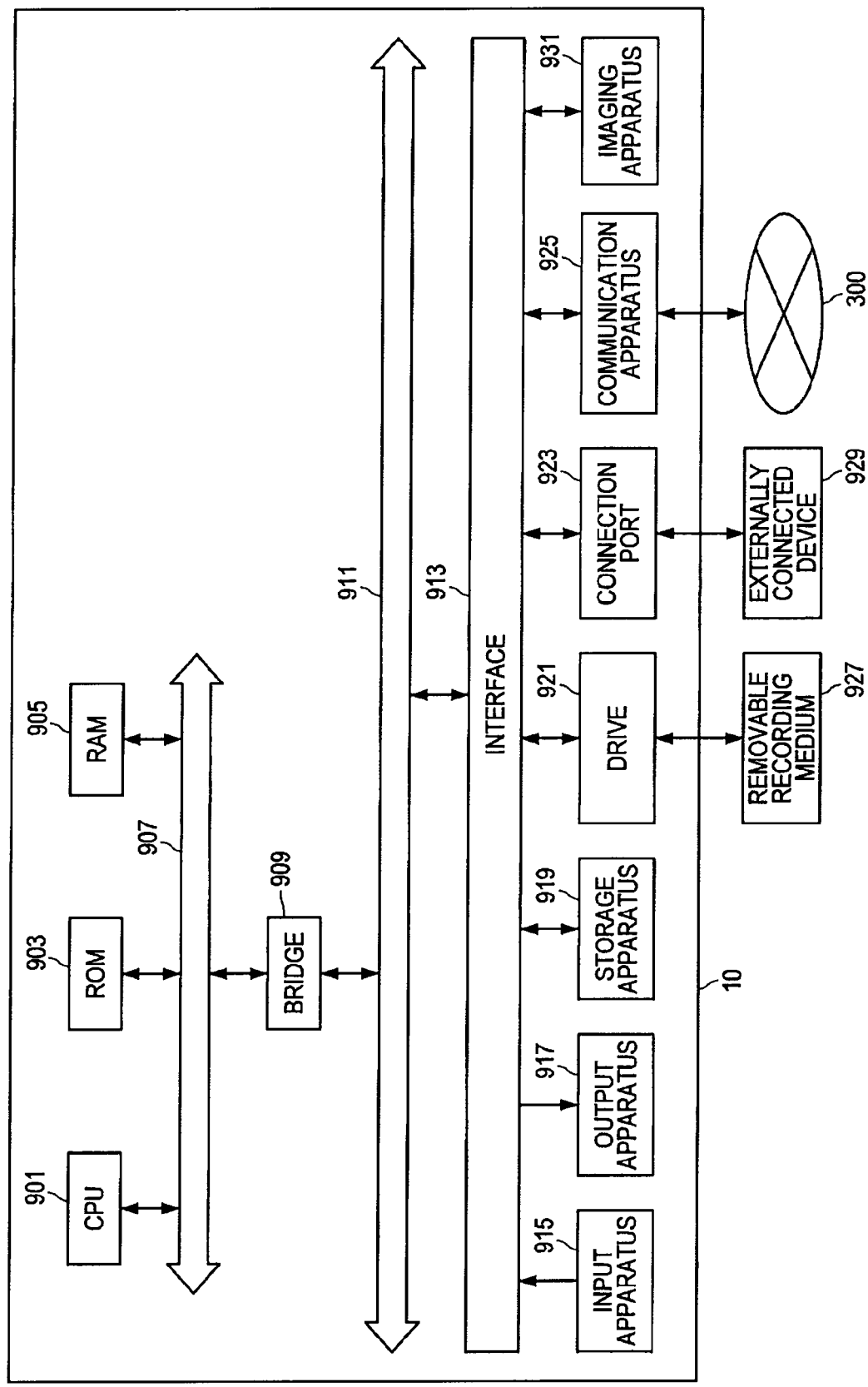
FIG. 10 is a block diagram showing a hardware configuration of the information processing apparatus according to the first embodiment of the present invention.

Next, the hardware configuration of an information processing apparatus according to the first embodiment of the present invention will be described. FIG. 10 is a block diagram showing the hardware configuration of an information processing apparatus according to the first embodiment of the present invention. The hardware configuration of an information processing apparatus according to the first embodiment of the present invention will be described below using FIG. 10.

The information processing apparatus 100 mainly includes a CPU 901, a ROM 903, a RAM 905, a host bus 907, a bridge 909, an external bus 911, an interface 913, an input apparatus 915, an output apparatus 917, a storage apparatus 919, a drive 921, a connection port 923, a communication apparatus 925, and the imaging apparatus 931.

The CPU 901 functions as an arithmetic processing unit and a control unit and controls an overall operation in the information processing apparatus 100 or a portion thereof according to various programs recorded in the ROM 903, the RAM 905, the storage apparatus 919, or a removable recording medium 927. The ROM 903 stores programs and operation parameters used by the CPU 901. The RAM 905 temporarily stores programs used for execution of the CPU 901 and parameters and the like that change as appropriate during execution thereof. These units are mutually connected by the host bus 907 configured of an internal bus such as a CPU bus.

The host bus 907 is connected to the external bus 911 such as a PCI (Peripheral Component Interconnect/Interface) bus via the bridge 909.

The input apparatus 915 is an operation unit operated by the user such as a mouse, keyboard, touch panel, button, switch, and lever. The input apparatus 915 may also be a remote control unit (the so-called remocon) using infrared rays or other radio waves or an externally connected device 929 such as a mobile phone and PDA compatible with operations of the information processing apparatus 100. Further, the input apparatus 915 is configured of, for example, an input control circuit that generates an input signal based on information input by the user using the above operation unit and outputs the input signal to the CPU 901. The user of the information processing apparatus 100 can input various kinds of data into the information processing apparatus 100 and provide instructions of processing operation by operating the input apparatus 915.

The output apparatus 917 is configured of an apparatus, for example, a display apparatus such as a CRT display apparatus, liquid crystal display apparatus, plasma display apparatus, EL display apparatus, or lamp, audio output apparatus such as a speaker and headphone, printer apparatus, mobile phone, or facsimile capable of visually or aurally notifying the user of obtained information. The output apparatus 917 outputs, for example, results obtained by various kinds of processing performed by the information processing apparatus 100. More specifically, the display apparatus displays, for example, results obtained by various kinds of processing performed by the information processing apparatus 100 as text or images. The audio output apparatus, on the other hand, outputs an audio signal configured of reproduced audio data, acoustic data and the like after the audio signal being converted into an analog signal.

The storage apparatus 919 is an apparatus for data storage constituted as an example of the storage unit of the information processing apparatus 100 and is configured of, for example, a magnetic storage device such as a Hard Disk Drive (HDD), semiconductor storage device, optical storage device, magneto-optical storage device or the like. The storage apparatus 919 stores programs executed by the CPU 901, various kinds of data, and acoustic signal data and image signal data obtained from outside.

The drive 921 is a reader/writer for recording media and is added to the information processing apparatus 100 internally or externally. The drive 921 reads information recorded in the removable recording medium 927 such as an inserted magnetic disk, optical disk, magneto-optical disk, and semiconductor memory and outputs the information to the RAM 905. The drive 921 can also write a record into the removable recording medium 927 such as an inserted magnetic disk, optical disk, magneto-optical disk, and semiconductor memory. The removable recording medium 927 is, for example, a DVD medium, HD-DVD medium, Blu-ray medium, CompactFlash (CF) (registered trademark), memory stick, or Secure Digital memory card (SD memory card). The removable recording medium 927 may also be, for example, an Integrated Circuit card (IC) on which a non-contact IC chip is mounted, electronic device or the like.

The connection port 923 is a port to directly connect devices to the information processing apparatus 100, for example, a universal serial bus (USB) port, IEEE1394 port such as i. Link, Small Computer System Interface (SCSI) port, RS-232C port, optical audio terminal, and High-Definition Multimedia Interface (HDMI) port. By connecting the externally connected device 929 to the connection port 923, the information processing apparatus 100 can obtain acoustic signal data or image signal data directly from the externally connected device 929 or provide acoustic signal data or image signal data to the externally connected device 929.

The communication apparatus 925 is a communication interface configured of, for example, a communication device to connect to the network 300. The communication apparatus 925 is, for example, a communication card for a wire or wireless LAN (Local Area Network), communication card for Bluetooth or wireless USB (WUSB), router for optical communication, router for asymmetric digital subscriber line (ADSL), or modem for various kinds of communication. For example, the communication apparatus 925 can transmit/receive acoustic signal or the like to/from the Internet and other communication devices. The network 300 connected to the communication apparatus 925 is configured of a network or the like connected by wire or by radio and may be, for example, the Internet, a home LAN, infrared-ray communication, radio wave communication, or satellite communication.

The imaging apparatus 931 has an image-formation optical system and an image sensor. An image is formed on the image sensor by the image-formation optical system to obtain a pickup image by photoelectric conversion. Pickup images obtained from the image sensor may be moving images obtained chronologically or still images obtained at a certain point. The image sensor is configured of, for example, CCD (Charge Coupled Device).

In the foregoing, an example of the hardware configuration that can realize the function of the information processing apparatus 100 according to the present embodiment of the present invention has been described. Each of the above components may be made up by using general-purpose members or by hardware specialized for the function of each component. Therefore, the hardware configuration to be used can be changed as appropriate in accordance with the technical level when the present embodiment is carried out.

In the foregoing, the hardware configuration of the information processing apparatus 100 according to the first embodiment of the present invention has been described. Next, the operation of an information processing apparatus according to the first embodiment of the present invention will be described.

[2-7. Operation of Information Processing Apparatus]

Figure 11:
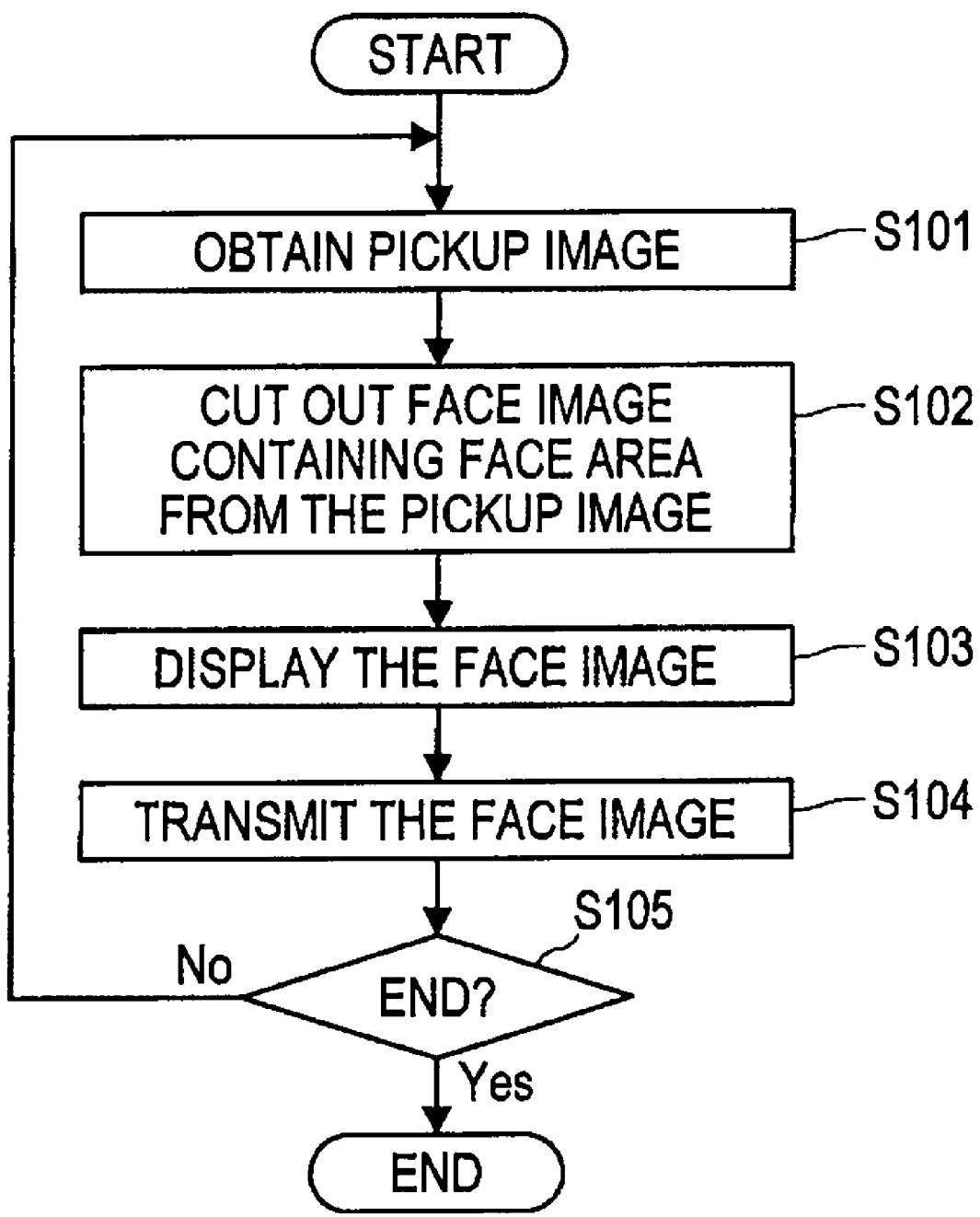
FIG. 11 is a flow chart showing an operation of the information processing apparatus according to the first embodiment of the present invention.

Next, the operation of an information processing apparatus according to the first embodiment of the present invention will be described. FIG. 11 is a flow chart showing the operation of an information processing apparatus according to the first embodiment of the present invention. The operation of an information processing apparatus according to the first embodiment of the present invention will be described using FIG. 11.

As shown in FIG. 11, the imaging unit 115 first obtains a pickup image of the user 210 (step S101). The control unit 116 cuts out the face image 240 containing a face area from the pickup image obtained by the imaging unit 115 (step S102). The control unit 116 causes the display unit 114 to display the cutout face image 240 (step S103). The control unit 116 transmits the face image 240 to another apparatus used by a communication partner of the user 210 (step S104). The control unit 116 determines whether the input unit 111 has accepted input of termination information indicating termination of communication from the user (step S105). If the control unit 116 determines that input of termination information has not been accepted ("No" at step S105), the control unit 116 returns to step S101. If the control unit 116 determines that input of termination information has been accepted ("Yes" at step S105), the control unit 116 terminates processing.

In the foregoing, the operation of the information processing apparatus 100 according to the first embodiment of the present invention has been described.

3. Modification of Information Processing Apparatus

It should be understood by those skilled in the art that various modifications, combinations, sub-combinations and alterations may occur depending on design requirements and other factors insofar as they are within the scope of the appended claims or the equivalents thereof.

The information processing apparatus 100 may be provided with a display control unit that displays predetermined information near the position where the imaging unit 115 is installed in the display area of the display unit 114.

The information processing apparatus 100 may be provided with the communication unit that performs data communication via the network 300 and a display control unit that displays data obtained via the communication unit 300 as predetermined information, which is displayed by the display control unit near the position where the imaging unit 115 is installed in the display area of the display unit 114.

The display control unit may display a face image of a communication partner performing data communication via the communication unit 113 and a face image cut out from a pickup image obtained by the imaging unit 115 in the display area as predetermined information.

The present application contains subject matter related to that disclosed in Japanese Priority Patent Application JP 2008-334346 filed in the Japan Patent Office on 26 Dec. 2008, the entire content of which is hereby incorporated by reference.

What is claimed is:

1. An information processing apparatus, comprising:
a display unit that displays predetermined information;
an imaging unit that is integrated into one of a right side or left side of a central portion of an upper frame of an outer frame enclosing the display unit to obtain a pickup image of a user, only one imaging unit being integrated into the outer frame enclosing the display unit;
an estimating unit configured to estimate a position of the imaging unit based on the pickup image of the user;
a control unit that detects a face area of the user from the pickup image obtained by the imaging unit to cut out the face area containing the detected face area; and
a display control unit that automatically displays the predetermined information near a position where the imaging unit is provided in a display area of the display unit.

2. The information processing apparatus according to claim 1, wherein
the imaging unit is installed near an edge of the upper frame.

3. The information processing apparatus according to claim 1, wherein
the imaging unit is installed, when viewed from the user, in an upper right crossing area where the upper frame and a right frame of the outer frame cross, or an upper left crossing area where the upper frame and a left frame of the outer frame cross.

4. The information processing apparatus according to claim 1, wherein
the imaging unit is installed, when viewed from the user, in an upper right crossing area where the upper frame and a right frame of the outer frame cross.

5. The information processing apparatus according to claim 1, further comprising:
a communication unit that performs data communication via a network, wherein
the display control unit displays data obtained via the communication unit in the display unit as the predetermined information.

6. The information processing apparatus according to claim 5, wherein the display control unit displays a face image of a communication partner performing data communication via the communication unit and a face image cut out from the pickup image obtained by the imaging unit in the display unit as the predetermined information.

7. An information processing method for an information processing apparatus having a display unit that displays predetermined information, an imaging unit, and a control unit, only one imaging unit being integrated into the outer frame enclosing the display unit, the method comprising:
obtaining a pickup image of a user by the imaging unit, the imaging unit being integrated into one of a right side or left side of a central portion of an upper frame of an outer frame enclosing the display unit;
estimating a position of the imaging unit based on the pickup image of the user;
detecting a face area of the user from the pickup image obtained by the imaging unit to cut out the face image containing the detected face area by the control unit; and
automatically displaying the predetermined information near a position where the imaging unit is provided in a display area of the display unit.

* * * * *